United States Patent [19]
Woodward

[11] Patent Number: 5,280,864
[45] Date of Patent: Jan. 25, 1994

[54] METHOD FOR TRANSIENTLY ALTERING THE MASS OF OBJECTS TO FACILITATE THEIR TRANSPORT OR CHANGE THEIR STATIONARY APPARENT WEIGHTS

[76] Inventor: James F. Woodward, 5549 Stetson Ct., Anaheim, Calif. 92807

[21] Appl. No.: 823,670

[22] Filed: Jan. 21, 1992

Related U.S. Application Data

[63] Continuation-in-part of Ser. No. 521,992, May 11, 1990, abandoned, which is a continuation-in-part of Ser. No. 31,157, Mar. 25, 1987, abandoned, which is a continuation-in-part of Ser. No. 919,647, Oct. 16, 1986, abandoned.

[51] Int. Cl.$^5$ .............................................. B64D 35/00
[52] U.S. Cl. ..................................................... 244/62
[58] Field of Search .................. 244/53 R, 62, 172

[56] References Cited
PUBLICATIONS

Woodward, "A New Experimental Approach to Mach's Principle and Relativistic Graviation" Foundations of Physics Letters, vol. 3, No. 5, 1990.

Primary Examiner—Galen L. Barefoot
Attorney, Agent, or Firm—Frishauf, Holtz, Goodman & Woodward

[57] ABSTRACT

This invention is a method for producing transient fluctuations in the inertial masses of material objects employing an effect that is a consequence of relativistic theories of gravitation. An extension of this method wherein pulsed thrust is applied sychronously with the mass fluctuations produced by the method to an object makes it possible to cause stationary changes in the object's apparent mass and weight and also to facilitate the transport of massive objects.

10 Claims, 1 Drawing Sheet

METHOD FOR TRANSIENTLY ALTERING THE MASS OF OBJECTS TO FACILITATE THEIR TRANSPORT OR CHANGE THEIR STATIONARY APPARENT WEIGHTS

This application is a continuation-in-part of application Ser. No. 07/521,992 filed May 11, 1990 which was a continuation in part of application Ser. No. 07/031,157, filed Mar. 25, 1987, which was a continuation-in-part of application Ser. No. 6/919,647, filed 16 Oct. 1986, and all now abandoned.

This invention concerns a method of temporarily reducing the inertial masses of objects, especially at repetitive short intervals. If a pulsed force is applied to an object sychronously with a repetitive mass fluctuation a stationary change in the apparent mass and weight of the object can be affected and the transport of the object can be facilitated. The transient mass reduction effect described herein upon which this invention is based is a consequence of all locally Lorentz-invariant theories of gravitation in which the inertia of objects is induced chiefly by their gravitational interaction with the distant matter in the Universe. In particular, this effect is consistent with and expected from the theory of general relativity, the prevailing theory of gravitation.

INTRODUCTION

It is widely believed that the relativistic effects predicted by relativistic theories of gravitation in general, and general relativity theory (GRT) in particular, are so small as to be of no practical value. This view is not correct. When account is taken of the gravitational induction of inertia and, concomitantly, the fact that the correct linear order theory of gravitation necessarily is a vector, not scalar, potential theory, one finds that the differential equation for the gravitational field, f, at linear order in the presence of matter is given by $$\nabla \cdot f = -\nabla^2 \Phi - (1/\rho c^2)\partial^2(\rho\Phi)/\partial t^2 = -4\pi G\rho, \quad (1)$$

where G is the Newtonian constant of gravitation, c the speed of light, $\rho$ the matter density at the field point and $\Phi$ the scalar gravitational potential. $\Phi$ is given by $$\Phi = G \int_V (\rho/r) dV, \quad (2)$$

where $\rho$ is now the matter density at the distance r from the field point and the integration extends over all space (i.e., out to the particle horizon).

Because contributions to the potential by matter decrease as $1/r$ with increasing distance, but the amount of matter in a spherical shell at a distance r increases as $r^2$, the dominant contributions to $\Phi$ are from the most distant matter in the Universe. Local contributions to $\Phi$, notwithstanding that they can have quite dramatic effects, are but miniscule perturbations of the potential due to cosmic matter which is here designated $\Phi_c$. $\Phi_c$, because of the size and large scale homogeneity and isotropy of the Universe, is essentially constant. Thus, if one ignores local contributions to $\Phi$ one finds that Equation (1) becomes $$4\pi G\rho = (\Phi_c/\rho c^2)\partial^2\rho/\partial, t^2 + \nabla^2\Phi. \quad (3)$$

The condition imposed by the gravitational induction of inertia is $\Phi_c/c^2 \approx 1$. So, employing the well-known relationship $E = mc^2$ in the form $\rho = E/c^2$, where E is the local energy density, Equation (3) can be rewritten as $$\rho \approx (\tfrac{1}{4}\pi G\rho_o c^2)\partial^2 E/\partial t^2 + \rho_o, \quad (4)$$

with $\rho_o$ the local rest-mass density. It follows from this equation that time-varying energy densities in material media are massive sources of the gravitational field. Note that up to relativistic limitations $\partial^2 E/\partial t^2$ can be made arbitrarily large and the term involving this quantity, if only briefly, can be made to dominate the sources of the gravitational field. Further details relating to the aforementioned matters and corroborative experimental results may be found in the following publications: James F. Woodward, Foundations of Physics Letters 3, 497–506 (1990), the essential contents of which are also to be found in the Appendix (pp. 11–20) of my above-mentioned preceding U.S. patent application Ser. No. 07/521,922, filed May 11, 1990, now abandoned, and other details published in Foundations of Physics Letters. 4, 299 (1991), and 4, 407–423 (1991).

SUMMARY OF THE INVENTION

The present invention is a method of enhancing or reducing the inertial masses of material objects based upon Equations (3) and (4) above. In greatest generality, that method consists of disposing apparatus such that large transient positive or negative values of the $\partial^2 E/\partial t^2$ term in Equations (3) and (4) are produced. Consider a region of space that encloses an object that contains such apparatus, the mass m enclosed is:

$$m \approx \int_V [\rho_o + (1/4\pi G\rho_o c^2)\partial^2 E/\partial t^2] dV. \quad (5)$$

To effect, for example, a transient mass reduction of the enclosed object, one merely makes the $\partial^2 E/\partial t^2$ term in the above equation assume a negative value of the desired magnitude. This may be done, for example, by the application of suitable electromagnetic fields. On this basis the application of a pulsed force to displace the massive object synchronized with large negative values of the rapidly varying large energy densities affecting it facilitates the displacement of the object by the applied force. Similarly, a stationary apparent mass and weight change can also be effected in an object containing a pulsed thrust or force generator and an element in which a pulsed mass variation is produced. The magnitude of the apparent weight change will depend on the magnitudes of the mass and weight fluctuation and thrust, and their relative phase.

BRIEF DESCRIPTION OF THE DRAWINGS

The invention is described below in further detail in terms of two non-limiting and purely illustrative examples by reference to the scientific basis in observation, theory and experiment on which rests not only the illustrative examples just mentioned, but also the full range of useful application of the invention and by reference to the annexed drawings in which:

In FIG. 3 an electric energy source ES powers a high-frequency electric alternator EA to excite a circuit resonant at the frequency of excitation and composed of an inductor L and a capacitor C. Thrust is supplied by a suitable source PT pulsed in phase with the reduced mass state in the LC circuit.

TWO EXAMPLES OF THE METHOD

In principle there are many ways in which one may produce large, rapidly varying energy densities where the inertial reaction mass fluctuation effect upon which this method is based is generated. Of all of the possible means available the specific method with the most advantages from the point of view of ease of generation and control is the application of rapidly varying electromagnetic fields, in circuits of straight-forward design, to the material core elements of the capacitive and/or inductive components. Both of the examples of the method described here employ alternating electromagnetic fields to produce useful effects.

I

The first example of a useful application of the method is a device whose apparent mass and weight can be adjusted simply by controlling the currents in two circuits. A device of this sort, which can be made quite compact, might find useful application, for example, as a component in the rotor of a high speed centrifuge where it would enable one to adjust the balance of the rotor while the rotor is spinning. Such a device is shown schematically in FIG. 1. The component labeled $m_1$ is one or more high voltage capacitor(s) that can be driven at frequencies up to several tens of kilohertz without appreciable losses. (Such capacitors are available from KD Components of Carson City, Nev.) The component labeled F is a force generator, for example, a piezoelectric ultrasonic force generator. (These are available from EDO Corporation, Electro-Ceramic Devices Division of Salt Lake City, Utah.) $m_2$ here is the mass of the suspended part of a weighing mechanism represented schematically by the spring in FIG. 1. (In the case of a centrifuge $m_2$ would be the mass of the rotor.)

Figure 1:
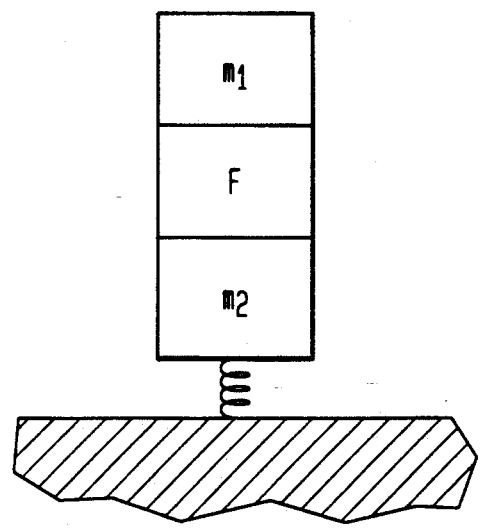
FIG. 1: is a schematic drawing of an apparatus in which a stationary apparent mass and weight shift can be produced by applying an alternating voltage to an array of capacitors with mass $m^1$ while at the same time applying a synchronous pulsed force or thrust on $m_1$ and $m_2$ with a piezoelectric (or other suitable) force generator F. $m_2$ is the mass of the object on which $m_1$ and F are mounted and the spring represents a weighing mechanism by means of which one can ascertain changes in the apparent mass and weight of the $m_1$, F, $m_2$ system.
Figure 2:
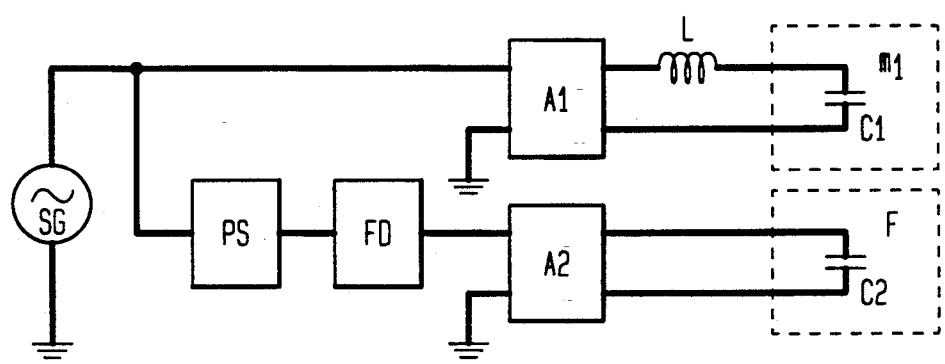
FIG. 2: is a schematic diagram of the electrical circuitry associated with the apparent mass and weight shift device shown schematically in FIG. 1. A sinusoidal signal generator SG with adjustable frequency and amplitude is the common signal source for two circuits, one of which consists of a power amplifier A1 (available output power $\geq 100$ watts) connected to a resonant LC circuit where the capacitance C1 is the array of capacitors in which a periodic mass fluctuation is generated, the other of which consists of an adjustable phase shifter and frequency doubler that condition the signal produced by SG before it is amplified by A2 to drive the piezoelectric crystals in F with capacitance C2.

The electrical circuitry associated with the mechanical components shown in FIG. 1 is displayed schematically in FIG. 2. A signal generator (SG) produces a sine wave current with a frequency on the order of 10 kilohertz that drives two circuits. The first circuit is simply a power amplifier (A1) that is equiped with a volume control. The amplifier (A1) is connected to an LC circuit where the capacitance (C1) is the element in which the mass fluctuation is produced by the alternating applied voltage. The inductor (L) is chosen so that the circuit is resonant at the operating frequency. The circuit is constructed in such a way as to maximize its "Q" so that a relatively low voltage output audio amplifier can be used.

The second circuit is comprised of a phase shifter, a frequency doubler, a power amplifier with volume control, and the sonic/ultrasonic force (thrust) generator. The phase shifter makes it possible to adjust the relative phase of the signals in the two circuits. The frequency doubler (which can be a full-wave bridge with a low pass filter that rejects all but the lowest harmonic) is required because the mass fluctuation in $m_1$ occurs at the power frequency at the capacitor(s) (C1) which is twice the applied voltage frequency. The oscillation frequency of piezoelectric force generators is the same as the applied voltage frequency, so to operate synchronously with the mass fluctuation in C1 the force transducer must operate at twice the frequency of the signal applied to C1.

To estimate the range of apparent mass and weight shift that can be achieved in such a device, on calculates as follows. The mass density fluctuation in C1 is given by Equation (4) above:

$$\delta\rho(t) \approx (\beta/4\pi G\rho_o c^2)\partial^2 E/\partial t^2. \quad (4)$$

$\delta\rho(t)$ integrated over the capacitor(s) is a transient mass fluctuation $\delta m(t)$ and $\partial^2 E/\partial t^2$ is the time rate of change of the power applied to the capacitors, that is $\partial P/\partial t$. One takes $P = P_o \sin(2\Omega t)$, where $\Omega$ is the angular frequency of the applied voltage, then Eq. (4) becomes $$\delta m(t) = (\beta\Omega P_o/2\pi g\rho_o c^2)\cos(2\Omega t), \quad (6)$$

or, defining $$\delta m_o = (\beta\Omega P_o/2\pi G\rho_o c^2), \quad (7)$$

then $$\delta m(t) = \delta m_o \cos(2\Omega t). \quad (8)$$

In the absence of voltages applied to the force generator and C1, the weight of the system is $(m_1 + m_2)g$, where q is the local acceleration of gravity. Applying a high frequency voltage to $m_1$ alone changes nothing since the mass fluctuation time averages to zero.

Take $l(t) = l_o + \delta l(t)$ as the thickness of the crystal that is the force generator. If $\delta l(t) = \delta l_o \sin(2\Omega t)$, then the relative acceleration of the faces of the crystal will be $$d^2 l(t)/dt^2 = -4\Omega^2 \delta l_o \sin(2\Omega t). \quad (9)$$

If $m_2 >> m_1$ then to sufficient approximation $m_1$ will be accelerated by this amount and $m_2$ will feel a reaction force $F = m_1 d^2 l(t)/dt^2$ in addition to the weight of $m_1$. If $m_1$ is constant, F time averages to zero. But if $$m_1 = m_o + \delta m_o \cos(2\Omega t + \phi), \quad (10)$$

where $\phi$ is the relative phase of $\delta m$ and $\delta l$, then $$F = -4\Omega^2 \delta l_o \sin(2\Omega t)[m_o + \delta m_o \cos(2\Omega t + \phi)]. \quad (11)$$

When F is time averaged the term in $m_o$ vanishes and $$<F> = -4\Omega^2 \delta l_o \delta m_o \sin(2\Omega t)\cos(2\Omega t + \phi). \quad (12)$$

A little algebra yields $$<F> = -2\Omega^2 \delta l_o \delta m_o \sin(4\Omega t + \phi) + 2\Omega^2 \delta l_o \delta m_o \sin\phi. \quad (13)$$

The first term on the RHS time averages to zero and one is left with $$<F> = 2\Omega^2 \delta l_o \delta m_o \sin\phi, \quad (14)$$

which is only zero if $\phi = 0°$. Since $<F>$ acts on $m_2$ in addition to $m_1 g$, the apparent mass and weight of the system must include $<F>$. And, in the cgs system of units, if $<F>$ is divided by g the resulting value will be the apparent weight shift in grams.

To estimate the apparent weight shift expected we take $\Omega \approx 6.3 \times 10^4$ (10 KHz). If $P_o \approx 10^9$ erg/s (100 watts), $\beta \approx 5$ and $\rho_o 3 \approx$ g/cm$^3$ we then find that $\delta m_o \approx$ a few tenths of a gram. And for this to appear as an effect on the order of a gram ($2\Omega^2 l_o/g \approx 10$, so $\delta l_o \approx 10^{-6}$ cm. This estimate of the effect, of course, is an idealization. For example, the mass fluctuations that take place in the force transducer and other parts of a real device that bear a constant phase relationship to $\delta l(t)$ have been ignored. Those fluctuations will interfere with the fluctuations driven separately in $m_1$ as the phase is changed. Also, at ultrasonic frequencies the wavelength of the sound waves in a device of this sort will be comparable to the dimensions of its components, so it will have to be designed bearing this in mind. But even when the efficiency of a real device is only 10%, or even only 1% of the ideal effect calculated here, useful apparent mass and weight shifts can be achieved when sufficient power is applied. And the mass and weight shift can be controlled easily in any one of three ways: First, the relative phase of the force generator and C1 oscillations can be adjusted. Second, the amplitude of the force generator oscillations can be adjusted with the volume control on A2. And third, $\delta m_o$ can be adjusted with the volume control on A1. One should be cautioned in building a device of this sort that the constituent parts must thoroughly adhere to each other. Imperfect adhesion, especially in the force generator, will render a device inoperable as far as apparent weight shifts are concerned.

II

The second example application of the method of transient mass shifts extends the first example to the facilitation of the transport of massive objects. As in the first example, the transient mass fluctuation effect is generated in a resonant LC circuit. To maximize the mass fluctuation effect, the circuit should be designed to operate at radio or microwave frequencies. And, again as in the first example, a synchronous pulsed thrust is used in conjunction with the mass fluctuation, in particular, in conjunction with the reduced mass part of each cycle. Since the thrust acts during the mass-reduced part of each cycle, less thrust than would otherwise be required is needed and the transport of the object is facillitated. The second illustrative example is shown schematically in FIG. 3.

Figure 3:
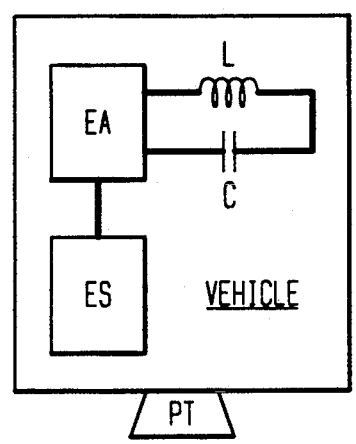
FIG. 3: is a schematic diagram of the chief components in a vehicle required to effect the transient (periodic) mass reduction that proceeds from rapidly varying energy densities.

In FIG. 3 an electric energy source (ES) powers a high-frequency electric alternator (EA) to excite a circuit resonant at the frequency of excitation and composed of an inductor (L) and a capacitor (C). The capacitor has a solid dielectric having a high dielectric constant, such as rutile (barium titanate) which, if design considerations permit, may be a structural component of the vehicle and, if necessary, quite massive. But any suitable dielectric substance, solid, liquid, or gaseous, that is convenient may be used. Moreover, in an actual vehicle it may prove desirable to use several of the LC circuits depicted in may be used. Moreover, in an actual vehicle it may prove desirable to use several of the LC circuits depicted in FIG. 3 instead of one and dispose them in various locations in the vehicle. The principle and method of this invention are unaffected by such variations. The vehicle is equiped with a pulsating thrust device (PT) that operates in synchronism with the alternator (EA). The phase of the pulsating thrust should be synchronized so that as far as possible the thrust in the desired direction coincides with the periodic mass-reduction effect. As in the first example, the frequency of the pulsed thrust should be twice the electrical frequency of resonance in the LC circuit(s) since that is the frequency of the power fluctuation in the LC circuit(s).

Since high efficiencies in the LC circuit(s) for large scale practical purposes (mass reductions on the order of many kilograms and more) can only be attained at radio (or higher) frequencies and the thrust must be pulsed at twice the resonant frequency, pulsed, directed microwave radiation is suggested as a likely source of thrust. The momentum carried by even a quite powerful beam of microwave radiation is, of course, quite small. For that reason, for pulsed microwave radiation to be a suitable source of thrust, the negative mass fluctuation in the LC circuit must be sufficiently large to render the total mass of the vehicle and its contents almost exactly zero.

To minimize strong electromagnetic fields in the environment surrounding the mass reduction components to minimize losses in the LC circuit a toroidal configuration for the inductive element(s) may be used. The use of field localizing inductive elements, however, requires that core materials be chosen with care. If core materials are used in the L and C components for which the mass reduction effect has the same phase with respect to the applied power, the mass reduction effects in the L and C components will be 180 degrees out of phase; as the mass is reduced in the L component it is enhanced in the C component. Since the total energy coursing back and forth between the L and C components is fixed, if $\beta$ is the same for the materials in the inductors and capacitors the effects in the two types of components will cancel. This problem can always be dealt with by not using field localizing inductors so that the material in which the effect is produced by the magnetic field (air or vacuum external to the vehicle) is mechanically decoupled from the vehicle.

A preferable solution is to use capacitor or inductor core elements that have a non-linear mechanical response. Since the effect is an inertial reaction effect, and hysteresis in ferroelectric (or ferromagnetic) substances causes the mechanical response to lag the applied field, This phase shift in either the L or C component(s)—but not both—lead to a residual net mass fluctuation. Thus one will want to optimize the core materials used in the L and C component(s). But one can always use air core inductors and rutile dielectric capacitors to achieve the desired performance if better materials cannot be found. The viability of the method here disclosed as it is applied in this particular practical application does not depend on finding better (more efficient) materials.

When the mass reduction apparatus works well and very large transient mass reductions are attained, the power required for the thrust device(s) will be quite modest. One should note, however, that the energy employed in the thrust device(s) is non-recoverable.

As regards the mass reduction device, the mass reduction attainable can be estimated employing Equation (7) above in the first example, namely, $$\delta m_o = \beta \Omega P_o / 2\pi G \rho_o c^2. \tag{7}$$

Using known values for G and c, and since $\beta/2\rho_o \approx 1$, one finds that $\beta/2\pi G \rho_o c^2 \approx 5.3 \times 10^{-15}$ (cgs).

Taking reasonable values for $\Omega$ and $P_o$ we can ascertain whether practical mass fluctuations can be achieved. For $P_o \approx 1 \times 10^{13}$ erg/sec. [one megawatt] and with $\Omega \approx 6.3 \times 10^8$ [100 megahertz] one gets (for several nanoseconds each cycle)

$$\delta m_o \approx \pm 3.3 \times 10^7 \text{ gm}.$$

Note that the megawatt of power is only required for a time sufficient to drive the LC circuit(s) into resonance. Continuous power requirements for the LC circuit(s) after activation will depend on losses in the circuit(s). These may be minimized by the use of low loss cores for the L and C elements and superconducting wiring. Since the losses will not be zero, provision for the disipation of waste heat must be made.

For this example with a mass reduction for several nanoseconds in each cycle of the 200 megahertz frequency at which time the mass fluctuates, the above mentioned thrust source for moving the vehicle must emit microwave pulses of sufficiently high frequency that at least several waves are emitted in a pulse with a duration of a nanosecond. This insures that a reasonable amount of energy-momentum is emitted from the thrust device during the mass reduced state in each cycle. This constraint, in the case of this example, restricts one to the use of microwaves of a frequency of about 10 gigahertz or higher.

I claim:

1. A method, based upon a transient mass fluctuation that occurs in matter where the second time-derivative of the local energy density is non-vanishing, expected in all locally Lorentz-invariant theories of gravitation, to produce periodic fluctuations in the inertial mass of a passive object, said method comprising the steps of:

disposing electromagnetic machinery capable of generating, at a minimum power of 50 watts, rapidly varying voltages varying periodically at an amplitude which exceeds 100 volts;

connecting said electromagnetic machinery to an electrical circuit including capacitative elements having voltage-sensitive dielectric material, said circuit being designed to be at least approximately resonant at a predetermined operating frequency of said electromagnetic machinery, and thereby causing fluctuating energy densities in said dielectric material of said capacitative elements such that the second time-derivative of the energy densities is periodically non-zero, thus inducing periodic mass fluctuations in said capacitative elements.

2. The method of claim 1 wherein the electric circuit to which said electromagnetic machinery is connected also has inductive elements having flux-sensitive core material, and wherein fluctuating energy densities are also caused in said core material such that the second time derivative of the energy is periodically non-zero, thus inducing additional periodic mass fluctuation which occur in said inductive elements.

3. A method, based upon a transient mass fluctuation that occurs in matter where the second time-derivative of the local energy density is non-vanishing, expected in all locally Lorentz-invariant theories of gravitation, to produce transient or periodic fluctuations in the inertial mass of a massive object, said method comprising the steps of:

disposing electromagnetic machinery capable of generating, at a minimum power of 50 watts, rapidly varying electric current varying periodically at an amplitude which exceeds one ampere;

connecting said electromagnetic machinery to an electrical circuit including inductive elements having flux-sensitive core material, said circuit being designed to be at least approximately resonant at a predetermined operating frequency of the machinery, and thereby causing fluctuating energy densities in the flux sensitive core material of said inductive elements such that the second time-derivative of the energy densities is periodically non-zero, thus inducing periodic mass fluctuations in said inductive elements.

4. The method of claim 3 wherein the electric circuit to which said electromagnetic machinery is connected also has capacitive element having voltage-sensitive dielectric material, and wherein fluctuating energy densities are also caused in said dielectrical material such that the second time derivatives of the energy is periodically non-zero thus inducing additional periodic mass fluctuations which occur in said capacitive elements.

5. A method, based upon a transient mass fluctuation that occurs in matter where and when the second time-derivative of the local energy density is periodically non-vanishing, of producing a stationary change in the apparent mass or weight of a massive object, said method compressing the steps of:

disposing electromagnetic machinery capable of generating, at a power of at least 50 watts, rapidly varying voltages varying periodically at an amplitude which exceeds 100 volts;

connecting said electromagnetic machinery to an electrical circuit including capacitative elements having voltage-sensitive dielectric material, said circuit being designed to be at least approximately resonant at a predetermined operating frequency of said electromagnetic machinery, mounting said capacitative elements on a force transducer which is in turn mounted on or in said object whose total apparent mass or weight is to be alterable, thereby making said capacitative elements and said force transducer parts of said object;

making provision for the adjustment of the relative phase of mass fluctuation in the capacitative elements and oscillatory acceleration producible by the force transducer, so that the resulting stationary force on the object of which the capacitative elements and force transducer are a part can be changed by adjusting said relative phase;

causing, by activating said electromagnetic machinery, fluctuating energy densities in said dielectric material of said capacitative elements such that the second time-derivative of the energy densities is periodically non-zero, thus inducing an oscillating mass fluctuation in said capacitative elements, and causing said force transducer to produce an oscillatory acceleration of said capacitative elements at the same frequency as the induced oscillating mass fluctuation.

6. A method, based upon a transient mass fluctuation that occurs in matter where and when the second time-derivative of the local energy density is periodically non-vanishing, of facilitating the transport of a massive object, said method comprising the steps of:

disposing electromagnetic machinery capable of generating, at a power of at least 50 watts, rapidly varying currents varying periodically at an amplitude which exceeds one ampere;

connecting said electromagnetic machinery to an electrical circuit including inductive elements having flux-sensitive dielectric material, said circuit being designed to be at least approximately resonant at a predetermined operating frequency of said electromagnetic machinery, mounting said inductive elements in or on a vehicle whose transport is to be facilitated;

equipping said vehicle with a directable thrust device aligned to act through the center of mass of the vehicle that can be pulsed at the frequency of said oscillating mass fluctuations;

making provision for the adjustment of the relative phases of said oscillating mass fluctuation in said inductive elements and of the pulsed thrust so that the thrust can be made to act during a part of every mass fluctuation cycle where the total mass of the vehicle is minimized, resulting in the displacement of the vehicle in a desired direction;

causing, by activating said electromagnetic machinery, fluctuating energy densities in said core material of said inductive elements such that the second time-derivative of the energy densities is periodically non-zero, thus inducing an oscillating mass fluctuation large enough to become negative for part of each cycle in the capacitative elements, and causing said force transducer to produce an oscillatory acceleration of said inductive elements at the same frequency as the induced oscillating mass fluctuation.

7. A method, based upon a transient mass fluctuation that occurs in matter where and when the second time-derivative of the local energy density is periodically non-vanishing, of producing a stationary change in the apparent mass or weight of a massive object, said method compressing the steps of:

disposing electromagnetic machinery capable of generating, at a power of at least 50 watts, rapidly varying voltages varying periodically at an amplitude which exceeds 100 volts;

connecting said electromagnetic machinery to an electrical circuit including capacitative elements having voltage-sensitive dielectric material, said circuit being designed to be at least approximately resonant at a predetermined operating frequency of said electromagnetic machinery, mounting said capacitive elements on a force transducer which is in turn mounted on or in said object whose total apparent mass or weight is to be alterable, thereby making said capacitative elements and said force transducer parts of said object;

making provision for the adjustment of the relative phase of mass fluctuation in the capacitative elements and oscillatory acceleration producible by the force transducer so that the resulting stationary force on the object, of which the capacitative elements and force transducer are a part, can be changed by adjusting said relative phase;

causing, by activating said electromagnetic machinery, fluctuating energy densities in said dielectric material of said capacitative elements such that the second time-derivative of the energy densities is periodically non-zero, thus inducing an oscillating mass fluctuation in said capacitative elements, and causing said force transducer to produce an oscillatory acceleration of said capacitative elements at the same frequency as the induced oscillating mass fluctuation.

8. The method of claim 7, wherein the application of said thrust pulses is performed by emitting, in line with the center of mass of said vehicle, pulses of electromagnetic radiation, each of said pulses containing a multiplicity of cycles of radiation of a predetermined frequency which is at least several times as great as the frequency of the mass fluctuation cycle.

9. A method, based upon a transient mass fluctuation that occurs in matter where and when the second time-derivative of the local energy density is periodically non-vanishing, of facilitating the transport of a massive object, said method comprising the steps of:

disposing electromagnetic machinery capable of generating, at a power of at least 50 watts, rapidly varying currents varying periodically at an amplitude which exceeds one ampere;

connecting said electromagnetic machinery to an electrical circuit including inductive elements having flux-sensitive core material, said circuit being designed to be at least approximately resonant at a predetermined operating frequency of said electromagnetic machinery;

mounting said inductive elements on a force transducer which is in turn mounted on or in said object whose total apparent mass or weight is to be alterable thereby making said inductive elements and said force transducer parts of said object;

making provision for the adjustment of the relative phase of mass fluctuation in the inductive elements and oscillatory acceleration producible by the force transducer so that the resulting stationary force on the object, of which the inductive elements and force transducer are a part, can be changed if desired by adjusting said relative phase;

causing, by activating said electromagnetic machinery, fluctuating energy densities in said core material of said inductive elements such that the second time-derivative of the energy densities is periodically non-zero, thus inducing an oscillating mass fluctuation in said inductive elements, and causing said force transducer to produce an oscillatory acceleration of said inductive elements at the same frequency as the induced oscillating mass fluctuation.

10. The method of claim 9, wherein the application of said thrust pulses is performed by emitting, in line with the center of mass of said vehicle, pulses of electromagnetic radiation, each of said pulses containing a multiplicity of cycles of radiation of a predetermined frequency which is at least several times as great as the frequency of the mass fluctuation cycle.

* * * * *

UNITED STATES PATENT AND TRADEMARK OFFICE
CERTIFICATE OF CORRECTION

PATENT NO. : 5,280,864

DATED : January 25, 1994

INVENTOR(S) : James F. Woodward

It is certified that error appears in the above-identified patent and that said Letters Patent is hereby corrected as shown below:

Col. 5, line 22, delete the " ( ".

Col. 6, lines 6-8, cancel the sentence "Moreover, in an actual vehicle it may prove desirable to use several of the LC circuits depicted in may be used."

Claim 5, line 6 (col. 8, line 43), change "compressing" to --comprising--.

Claim 6, line 12 (col. 9, line 19), change "dielectric" to --core--.

Claim 7, line 6 (col. 9, line 53), change "compressing" to --comprising--;

UNITED STATES PATENT AND TRADEMARK OFFICE
CERTIFICATE OF CORRECTION

PATENT NO. : 5,280,864

DATED : January 25, 1994

INVENTOR(S) : James F. Woodward

It is certified that error appears in the above-identified patent and that said Letters Patent is hereby corrected as shown below:

claim 7, cancel the paragraph at line 17-21
    (col. 9, lines 64-68), reading:
    "mounting said capacitive elements on a force trans-
        ducer which is in turn mounted on or in said object
        whose total apparent mass or weight is to be alter-
        able, thereby making said capacitive elements and
        said force transducer parts of said object;",

UNITED STATES PATENT AND TRADEMARK OFFICE
CERTIFICATE OF CORRECTION

PATENT NO. : 5,280,864
DATED : January 25, 1994
INVENTOR(S) : James F. Woodward

It is certified that error appears in the above-identified patent and that said Letters Patent is hereby corrected as shown below:

and substitute therefor the following:
--mounting said capacitative elements in or on a vehicle whose transport is to be facilitated; equipping said vehicle with a directable thrust device aligned to act through the center of mass of the vehicle that can be pulsed at the frequency of said oscillating mass fluctuations;--.

Claim 10, line 1 (col. 10, line 61), change "claim 9" to --claim 6--.

Signed and Sealed this

Twenty-third Day of August, 1994

Attest:

BRUCE LEHMAN

Attesting Officer

Commissioner of Patents and Trademarks